United States Patent Office 3,361,736
Patented Jan. 2, 1968

3,361,736
MIXTURES OF WATER-INSOLUBLE
DISAZO DYESTUFFS
Joachim Ribka, Offenbach am Main, Germany, assignor to Farbwerke Hoechst Aktiengesellschaft vormals Meister Lucius & Brüning, Frankfurt am Main, Germany, a corporation of Germany
No Drawing. Filed Feb. 17, 1965, Ser. No. 433,449
Claims priority, application Germany, Feb. 22, 1964,
F 42,094; Jan. 16, 1965, F 44,978
3 Claims. (Cl. 260—176)

ABSTRACT OF THE DISCLOSURE

Water-insoluble disazo dyestuff mixtures consisting of two symmetrical dyestuffs and one asymmetrical dyestuff prepared by coupling tetrazotized 4,4'-diamino-3,3'-dichlorodiphenyl with a mixture of 1-acetoacetylamino-2-methoxybenzene and 1-acetoacetylamino-2,4-dimethylbenzene or with a mixture of 1-acetoacetylamino-2-methoxybenzene and 1-acetoacetylamino-2,5-dimethoxy-4-chlorobenzene.

---

The present invention provides new water-insoluble disazo dyestuffs and a process for preparing them; more particularly, it relates to dyestuff mixtures of each time two symmetrical and one asymmetrical dyestuff of the formula

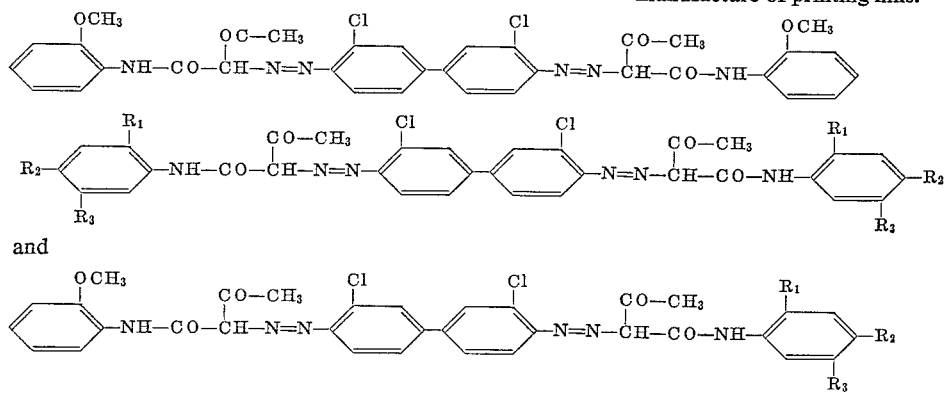

in which $R_1$ and $R_2$ represent methyl groups and $R_3$ represents a hydrogen atom, or $R_1$ and $R_3$ represent methoxy groups and $R_2$ represents a chlorine atom.

It has been known that by coupling 1 mol of tetrazotized 4,4'-diamino-3,3'-dichlorodiphenyl with 2 mols of 1-acetoacetylamino-2-methoxybenzene or with 2 mols of 1-acetoacetylamino-2,4-dimethylbenzene water-insoluble yellow disazo dyestuffs are obtained which may be used as pigment dyestuffs for the dyeing of rubber, polyvinyl compounds, polystyrene and for the preparation of printing inks (cf. Colour Index, second edition 1956, volume 2 and volume 3, and Supplement 1963, Permanentgelb GG=C.I. Pigment Yellow 17=C.I. 21,105, and Permanentgelb GR=C.I. Pigment Yellow 13=C.I. 21,100).

Now, it has been found that by coupling 1 mol of tetrazotized 4,4'-diamino-3,3'-dichlorodiphenyl with 2 mols of a mixture of 1-acetoacetylamino-2-methoxybenzene and 1-acetoacetylamino-2,4-dimethylbenzene or with 2 mols of a mixture of 1-acetoacetylamino-2-methoxybenzene and 1-acetoacetylamino-2,5-dimethoxy-4-chlorobenzene valuable yellow disazo dyestuffs are obtained the dyeing properties of which are superior to those of the known dyestuffs.

The new dyestuffs are prepared according to known methods by coupling the tetrazotized diamine with a mixture of both coupling components, for example, in an aqueous medium, suitably in the presence of a non-ionic, anion-active or cation-active dispersing agent or in the presence of an organic solvent such, for example, as pyridine, quinoline or dimethylformamide. To improve the physical properties of the pigments it may be of advantage to heat, for example to boil, the coupling mixture for some time, while simultaneously adding small amounts of an organic solvent, for example pyridine, chlorobenzene or a phthalic acid dialkyl ester or a resin soap.

The two coupling components may be admixed with one another in various ratios, depending on the desired properties regarding application of the pigment to be prepared. For example, the coupling components may be mixed with one another in the ratios of 1:1, 2:1, 3:1, 5:1 or 9:1. The disazo dyestuff mixtures obtained consist each time of one asymmetrical and two symmetrical disazo dyestuffs, whose quantity in the dyestuff mixture depends on the coupling conditions and on the ratio of mixture of the two coupling components.

The disazo dyestuffs obtained are water-insoluble pigments which are distinguished by good fastness to light and to solvents. They are suitable for the dyeing of plastic masses, synthetic and natural resins, lacquers and lake-formers, for the dyeing of spinning masses as well as for the dyeing and printing of paper and textiles according to the known pigment printing and dyeing processes. Owing to their excellent properties with regard to application, the new dyestuffs are especially suitable for the manufacture of printing inks.

The following examples illustrate the invention but they are not intended to limit it thereto:

Example 1

21.8 parts by weight of 1-acetoacetylamino-2,4-dimethylbenzene and 21.6 parts by weight of 1-acetoacetylamino-2-methoxybenzene were dissolved at room temperature, while stirring, in a mixture of 500 parts by volume of water and 46 parts by volume of 5 N-sodium hydroxide solution. An aqueous solution of 2 parts by weight of the reaction product of about 20 mols of ethylene oxide and 1 mol of octadecyl alcohol was added to the solution. The coupling components were then precipitated by the addition of 15 parts by volume of glacial acetic acid. The fine suspension thus obtained was combined with an aqueous solution of 55 parts by weight of crystallized sodium acetate. Coupling was effected at about 20° C., by adding to the suspension of the coupling components, while stirring, during about 1–1½ hours, a solution of tetrazotized 4,4'-diamino-3,3'-dichlorodiphenyl (prepared by dissolution of 25.3 parts by weight of 4,4'-diamino-3,3'-dichlorodiphenyl in the form of the hydrochloride in 800 parts by volume of water and 100 parts by volume of 5 N-hydrochloric acid, tetrazotization by means of 40 parts by volume of 5 N-sodium nitrite solution and clarification of the tetrazo solution by means of silica gel).

When coupling was completed, the mixture was stirred for one hour and combined with an aqueous solution of 7 parts by weight of calcium chloride; the coupling mixture was then heated to 95° C. and kept at this temperature for 20 minutes. The dyestuff that has formed was separated by filtration with suction, washed and dried.

A printing ink for graphical purposes prepared with the yellow pigment dyestuff thus obtained gave prints with a very high tinctorial strength. With regard to shade, these prints corresponded to the prints obtained with the dyestuff Permanentgelb GG (=C.I. 21,105), but their tinctorial strength was by about 30% higher than that of the latter dyestuff. Compared with the prints obtained with Permanentgelb GR (=C.I. 21,100), the prints produced with the dyestuff of the present Example 1 were more greenish and exhibited a higher transparency.

*Example 2*

The process was carried out as described in Example 1 and after completion of coupling, the reaction mixture was stirred for one hour. An aqueous solution of 7 parts by weight of calcium chloride and an aqueous solution of 11 parts by weight of resin soap were added to the coupling mixture; the coupling mixture was heated to 95° C. and kept at this temperature for 20 minutes. The dyestuff was then separated by filtration with suction, washed and dried. A yellow pigment dyestuff was obtained. A printing ink for graphical purposes prepared with this dyestuff gave prints of high tinctorial strength and greater transparency than prints made with the dyestuff of Example 1.

*Example 3*

The process was carried out as described in Example 1, but using as the dispersing agent instead of the reaction product of about 20 mols of ethylene oxide and 1 mol of octadecyl alcohol, the same quantity by weight of a dibutylnaphthalene-sulfonic acid. A yellow pigment dyestuff was obtained which, incorporated into a printing ink for graphical purposes, gave prints of high tinctorial strength and of a transparency which was superior to that of prints made with the dyestuff of Example 1.

*Example 4*

32.7 parts by weight of 1-acetoacetylamino-2,4-dimethylbenzene and 10.8 parts by weight of 1-acetoacetylamino-2-methoxybenzene were dissolved at room temperature, while stirring, in a mixture of 500 parts by volume of water and 46 parts by volume of a 5 N-sodium hydroxide solution. An aqueous solution of 2 parts by weight of a reaction product of about 20 mols of ethylene oxide and 1 mol of octadecyl alcohol was added to the solution. The coupling components were then precipitated by the addition of 15 parts by volume of glacial acetic acid. The fine suspension thus obtained was then coupled in the course of 1–1½ hours, at about 20° C., with a solution of tetrazotized 4,4'-diamino-3,3'-dichlorodiphenyl prepared as described in Example 1, while keeping the coupling mixture weakly acid by the simultaneous addition of an aqueous solution of sodium acetate. When coupling was completed, the mixture was stirred for 1 hour, then heated to 95° C. and kept for 20 minutes at this temperature; the dyestuff that had formed was separated by filtration with suction, washed and dried.

A yellow pigment dyestuff was obtained. A printing ink for graphical purposes prepared with this dyestuff gave prints of high tinctorial strength, whose shade was more reddish and whose tinctorial strength was higher than that of prints prepared with the dyestuff of Example 1.

*Example 5*

The process was carried out as described in Example 1, but using a mixture of 27.3 parts by weight of 1-acetoacetylamino-2,4-dimethylbenzene and 16.2 parts by weight of 1-acetoacetylamino-2-methoxybenzene. A yellow pigment dyestuff was obtained which exhibited very good properties regarding application on incorporation into a printing ink. The prints prepared with this ink showed a higher tinctorial strength than the prints prepared with the dyestuff of Example 1.

*Example 6*

The process was carried out as described in Example 1, but using a mixture of 19.8 parts by weight of 1-acetoacetylamino-2,4-dimethylbenzene and 23.8 parts by weight of 1-acetoacetylamino-2-methoxybenzene.

A yellow pigment dyestuff was obtained which exhibited very good properties with regard to application upon incorporation into a printing ink. The prints prepared with this ink were more greenish than the prints made with the dyestuff of Example 1.

*Example 7*

The process was carried out as described in Example 1, but using a mixture of 2.2 parts by weight of 1-acetoacetylamino-2,4-dimethylbenzene and 41.3 parts by weight of 1-acetoacetylamino-2-methoxybenzene.

A yellow pigment dyestuff was obtained which, incorporated into a printing ink, gave greenish yellow prints and which had very good properties regarding application.

*Example 8*

39 parts by weight of 1-acetoacetylamino-2-methoxybenzene and 6 parts by weight of 1-acetoacetylamino-2,5-dimethoxy-4-chlorobenzene were dissolved, at room temperature, in a mixture of 320 parts by volume of water and 50 parts by volume of 5 N-sodium hydroxide solution. The solution was clarified by means of silica gel, and the filtrate was introduced at 0° C., in the course of about 30 minutes, into a mixture of 340 parts by volume of water, 18 parts by weight of glacial acetic acid and an aqueous solution of 1.5 parts by weight of the reaction product of about 20 mols of ethylene oxide and 1 mol of octadecyl alcohol. The fine suspension obtained was then added, at 20° C., in the course of about 1 hour, a solution of tetrazotized 4,4'-diamino-3,3'-dichlorodiphenyl (prepared by dissolution of 25.3 parts by weight of 4,4'-diamino-3,3'-dichlorodiphenyl in water with addition of 100 parts by volume of 5 N-hydrochloric acid, tetrazotization by means of 40 parts by volume of 5 N-sodium nitrite solution and clarification of the tetrazo solution by means of silica gel).

When coupling was complete, the mixture was stirred for 1 hour, an aqueous solution of 7 parts by weight of calcium chloride was added, the coupling mixture was heated to 90° C. and kept for 20 minutes at this temperature. The dyestuff that had formed was separated by filtration with suction, washed and dried.

A printing ink for graphical purposes prepared with the yellow pigment dyestuff thus obtained gave prints that had a high tinctorial strength. The shade of these prints corresponded to that of prints obtained with the dyestuff Permanentgelb GG (=C.I. 21,105), but the tinctorial strength of these prints was by about 30% higher than that of the latter prints.

*Example 9*

The process was carried out as described in Example 8 and when coupling was completed, the reaction mixture was stirred for one hour. An aqueous solution of 7 parts by weight of calcium chloride and an aqueous solution of 11 parts by weight of resin soap were added to the coupling mixture, the mixture was heated to 95° C. and kept for 20 minutes at this temperature. The dyestuff was then separated by filtration with suction, washed and dried. A yellow pigment dyestuff was obtained. A printing ink for graphical purposes prepared with this dyestuff gave prints of high tinctorial strength and of a transparency which was better than that of the prints prepared with the dyestuff of Example 8.

Example 10

The process was carried out as described in Example 8, but using a mixture of 21.6 parts by weight of 1-acetoacetylamino-2-methoxybenzene and 30 parts by weight of 1-acetoacetylamino-2,5-dimethoxy-4-chlorobenzene. A yellow pigment dyestuff was obtained which exhibited very good properties with regard to application on incorporation into a printing ink. The prints prepared therewith were considerably more reddish than the prints prepared with the dyestuff of Example 8.

What is claimed is:
1. Mixtures of water-insoluble disazo dyestuffs consisting of two symmetrical dyestuffs and one asymmetrical dyestuff of the formulae

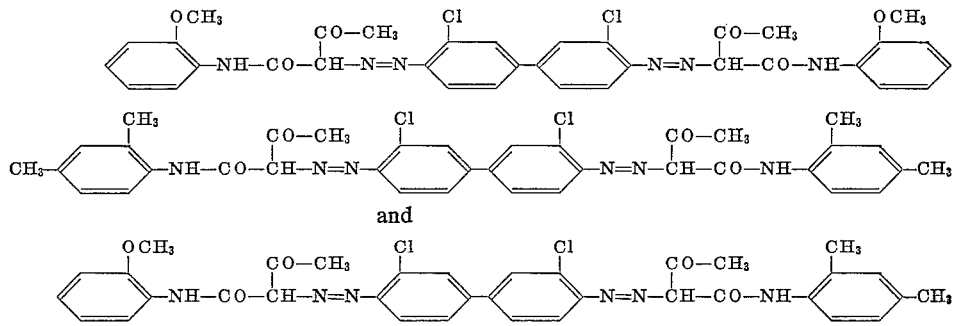

in which $R_1$ represents a member selected from the group consisting of methyl and methoxy, $R_2$ represents a member selected from the group consisting of methyl and chlorine and $R_3$ represents a member selected from the group consisting of hydrogen and methoxy, with the proviso that $R_1$ and $R_2$ represent methyl when $R_3$ stands for hydrogen and that $R_1$ and $R_3$ stand for methoxy, when $R_2$ stands for chlorine.

2. A mixture of water-insoluble disazo dyestuffs consisting of dyestuffs of the formulae

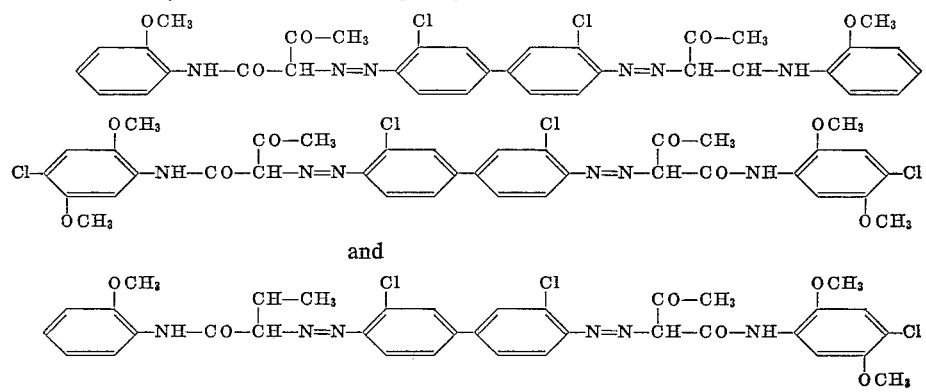

3. A mixture of water-insoluble disazo dyestuffs consisting of dyestuffs of the formulae

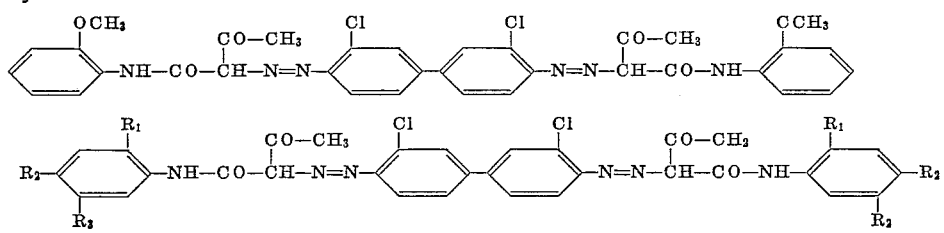

and

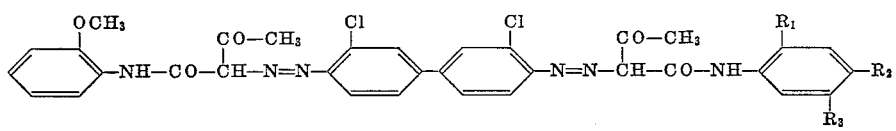

References Cited

UNITED STATES PATENTS

| | | | |
|---|---|---|---|
| 2,361,566 | 10/1944 | Reynolds | 260—176 |
| 2,657,204 | 10/1953 | DeLucia et al. | 260—176 |
| 2,739,146 | 3/1956 | Weigele et al. | 260—176 |
| 2,984,660 | 5/1961 | Ribka | 260—176 |
| 3,030,354 | 4/1962 | Ribka | 260—176 |
| 3,218,311 | 11/1965 | Forter et al. | 260—161 |

FLOYD D. HIGEL, *Primary Examiner.*